Sept. 1, 1970
A. D. JOHNSON
3,526,800
CATHODE RAY TUBE HAVING INDEPENDENT FRONT AND REAR DISPLAYS
Filed Oct. 30, 1967
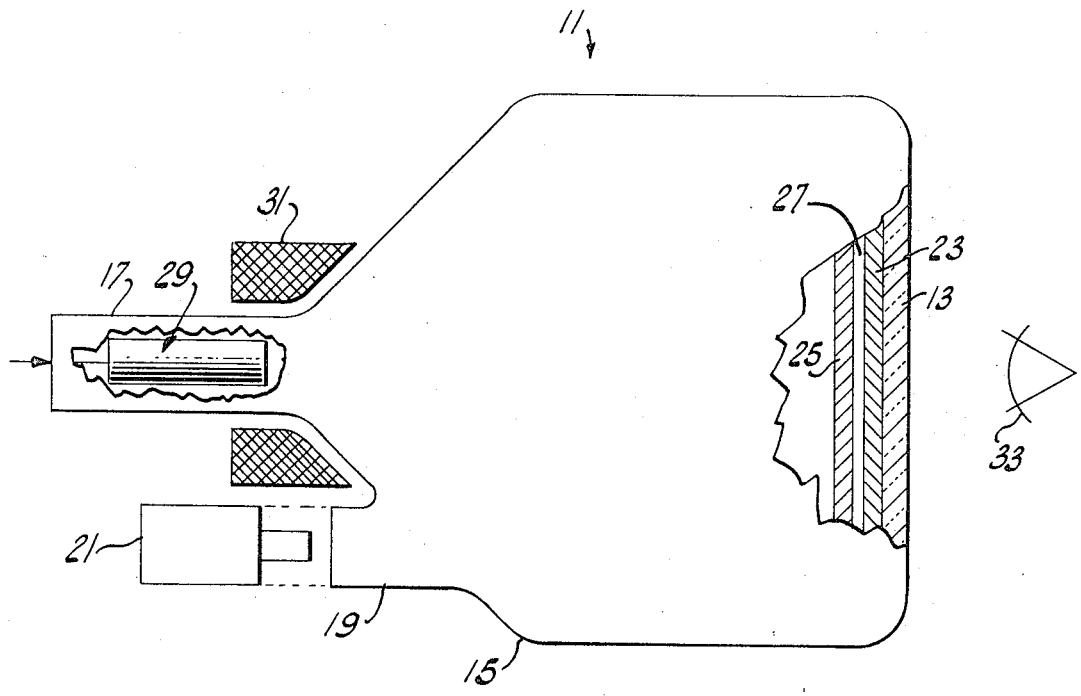
INVENTOR.
ALFRED D. JOHNSON
BY
*Robert E. Strausser*
ATTORNEY

3,526,800
CATHODE RAY TUBE HAVING INDEPENDENT FRONT AND REAR DISPLAYS

Alfred D. Johnson, Seneca Falls, N.Y., assignor to Sylvania Electric Products Inc., a corporation of Delaware
Filed Oct. 30, 1967, Ser. No. 679,002
Int. Cl. H01j 29/26, 29/28
U.S. Cl. 313—92                         1 Claim

ABSTRACT OF THE DISCLOSURE

A rear-view cathode ray tube having a cascade screen comprising two phosphor layers separated by an aluminum film. The forward layer of phosphor is selected to provide maximum brightness matched to the response characteristics of the frontal observer. The rear phosphor material is chosen to provide maximum brightness matched to the response characteristics of the rear port observation means, i.e., a camera. The aluminum film also acts as an excellent ambient light filter for improved rear-view observation.

BACKGROUND OF THE INVENTION

The rear-view cathode ray tube used in conjunction with a display system has a normal front viewing surface, but additionally includes a rear port to permit observation of the screen from the rear, thereby permitting, for example, simultaneous observer and camera usage. Thus, it is possible to produce a permanent record of the displayed information via a camera at the rear port, without interfering in any way with the frontal observer. Such tubes are normally used in systems operating in environments which vary from bright sunlight to total darkness; that is, the dynamic range of ambient light brightness is quite high. Prior art rear port tubes using a single phosphor layer screen experienced difficulty in providing a satisfactory recording image since the recording device at the rear port was not capable of tracking over the widely varying range of light conditions. As a result the display image seen at the rear port tended to appear washed out or overexposed under high ambient light conditions and underexposed during low ambient light conditions. Furthermore, with prior art systems the screen material was chosen to provide maximum brightness and efficiency to the frontal observer. Therefore, the display as seen from the rear port tube did not match the response characteristics of the rear port observation means and as a result the recorded image was of poor quality.

OBJECTS AND SUMMARY OF THE INVENTION

Accordingly, it is an object of the present invention to provide a rear-view cathode ray tube which overcomes the deficiencies of prior art devices.

Another object of this invention is to provide a rear-view cathode ray tube having outputs matched to both the frontal observer and a rear-view observation means.

Yet another object of the present invention is to provide a rear-view cathode ray tube which is relatively unaffected by varying ambient light conditions as seen from the rear port.

According to one aspect of the invention, a rear-view cathode ray tube has a cascaded screen comprising two layers of phosphors. The forward layer of phosphor of the screen is selected to provide a maximum efficiency frontal display to the forward viewing observer, and the phosphor material of the rear portion of the screen is chosen to provide maximum efficiency to the characteristics of the rear port observation means.

BRIEF DESCRIPTION OF THE DRAWING

The accompanying figure is an elevational view partially in section of a rear-view cathode ray tube according to the present invention.

DESCRIPTION OF THE PREFERRED EMBODIMENT

For a better understanding of the present invention, together with other and further objects, advantages, and capabilities thereof, reference is made to the following disclosure and appended claims in connection with the abovedescribed drawing.

Referring now to the figure, there is shown a rear-view cathode ray tube 11 consisting of a face plate 13, a funnel portion 15, and the tube neck 17. At the rear of the funnel portion 15, is the rear-view port 19 having a window opening therein so that a device such as a camera 21 is exposed to the rear of the screen mounted on the face plate 13. The phosphor screen is of the cascade type and consists of a frontal phosphor layer 23, a rear phosphor layer 25 and an aluminum film 27 placed therebetween. An electron gun 29 is mounted in the tube neck 17, and a deflection yoke assembly 31 is disposed about the exterior of the neck 17 in close proximity to the funnel portion 15 of the tube 11.

In operation the rear-view cathode ray tube receives the display signal information, which is applied to the input of the electron gun 29. The deflection yoke assembly causes the electron beam emanating from the electron gun to appropriately scan the cascaded phosphor screen thereby displaying the information. The frontal observer, i.e., 33, sees the display information resulting from the luminescence of the frontal phosphor layer 23 of the screen. The camera 21, or other rear viewing means, through the port 19 sees the display information resulting from the luminescence of the rear phosphor layer 25. The thin layer of aluminum film 27 acts as an ambient light filter so that changes in light level from the frontal viewing position do not adversely effect the display as seen through the rear port 19. Also, the thin film of aluminum will act to trap all ions on the frontal phosphor layer 23 and thereby give protection against ion burn, and therefore the frontal phosphor layer 23 will not exhibit discoloration after continued use of the tube. The aluminum additionally prevents display charging and provides increased brightness front and rear because of its reflective property.

In a typical application, such as a radar display with the requirement that the displayed information be recorded on film to provide a permanent record thereof, the frontal phosphor layer 23, such as, for example, P31 phosphor material composition, is peaked to the requirements of the observer viewing the front of the screen. The rear layer 25 can be then peaked to the response characteristics of the camera film, such as, for example, using a P11 phosphor material composition. Of course, various other phosphor materials can be utilized depending upon the particular system requirements.

It is therefore apparent that applicant has provided an improved rear-view cathode ray tube display device. Using the cascaded screen concept, the frontal phosphor layer is peaked to provide maximum efficiency of the phosphor with respect to the characteristic of the operator observer's responses and at the same time by peaking the characteristics of the rear-view phosphor layer to coincide with those of the rear port observation means, i.e., the camera, it is possible to make an accurate permanent record of the information displayed. In addition, the aluminizing film placed between the two phosphor layers reduces the possibility of ambient light variations effecting the quality of the reported display.

While there has been shown and described what is at present considered the preferred embodiment of the invention, it will be obvious to those skilled in the art that various changes and modifications may be made therein without departing from the scope of the invention as defined by the appended claim.

I claim:
1. A rear-view cathode ray tube comprising:
a tube envelope including a face plate, a neck portion and a funnel portion therebetween with a rear-view port located to the rear of said funnel portion and substantially parallel to said face plate;
a multilayer cascaded screen deposited on the inner surface of said face plate, said screen including a frontal phosphor layer uniformly disposed on said face plate and a rear phosphor layer uniformly disposed parallel thereto with an electron penetrable and light-opaque uniform aluminum layer positioned between said frontal phosphor layer and said rear phosphor layer to provide an enhanced frontal oriented image display substantially free of ion initiated discoloration and an intense rear oriented image display substantially free of frontal ambient light effects; said first phosphor material having a luminescence and persistence matched to discrete response characteristics of a frontal observation means, and wherein the rear phosphor layer comprises a second phosphor material having a luminescence and persistence matched to discrete responce characteristics of a rear view recording means; and
an electron gun positioned in said tube neck portion in a manner to direct an electron beam to impinge and excite said rear phosphor layer and said frontal phosphor layer of said screen to provide like display signal information simultaneously in each of said phosphor layers.

References Cited

UNITED STATES PATENTS

| | | | |
|---|---|---|---|
| 3,047,870 | 7/1962 | Bousky | 313—92 X |
| 3,369,179 | 2/1968 | Tanaka | 313—92 X |
| 2,403,227 | 7/1946 | Leverenz. | |
| 2,774,003 | 12/1956 | Leverenz. | |
| 3,271,610 | 9/1966 | Law. | |

ROBERT SEGAL, Primary Examiner